(No Model.) 2 Sheets—Sheet 2.

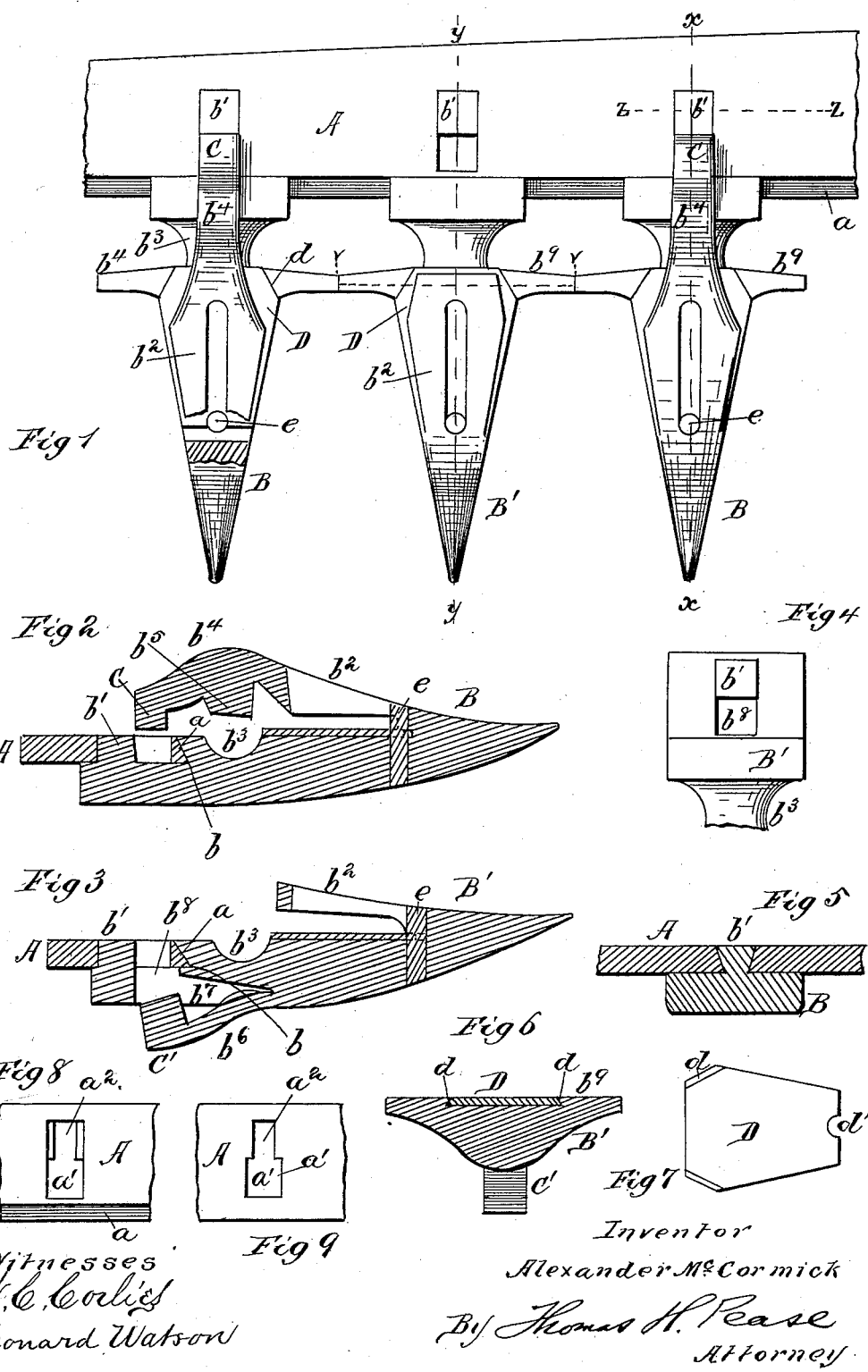

A. McCORMICK.
GUARD FINGER AND FINGER BAR.

No. 358,050. Patented Feb. 22, 1887.

Witnesses,
W. C. Corlies
Irvine Miller

Inventor,
Alexander McCormick
By Thomas H. Pease
Atty.

United States Patent Office.

ALEXANDER McCORMICK, OF CHICAGO, ILLINOIS.

GUARD-FINGER AND FINGER-BAR.

SPECIFICATION forming part of Letters Patent No. 358,050, dated February 22, 1887.

Application filed June 14, 1886. Serial No. 205,044. (No model.)

*To all whom it may concern:*

Be it known that I, ALEXANDER MCCORMICK, a citizen of the United States, residing in the city of Chicago, in the county of Cook, in the State of Illinois, have invented a certain new and useful Improvement in Guard-Fingers and Finger-Bars; and I declare that the following is a full, clear, and exact description of the same, reference being had to the accompanying drawings, which form a part of this specification.

My invention relates to reaping and mowing machinery; and it consists in certain improved means for connecting and locking the guard-fingers with the other parts of the cutting mechanism, which means I will proceed to describe particularly, and will afterward point out definitely in the claims.

Figure 10:
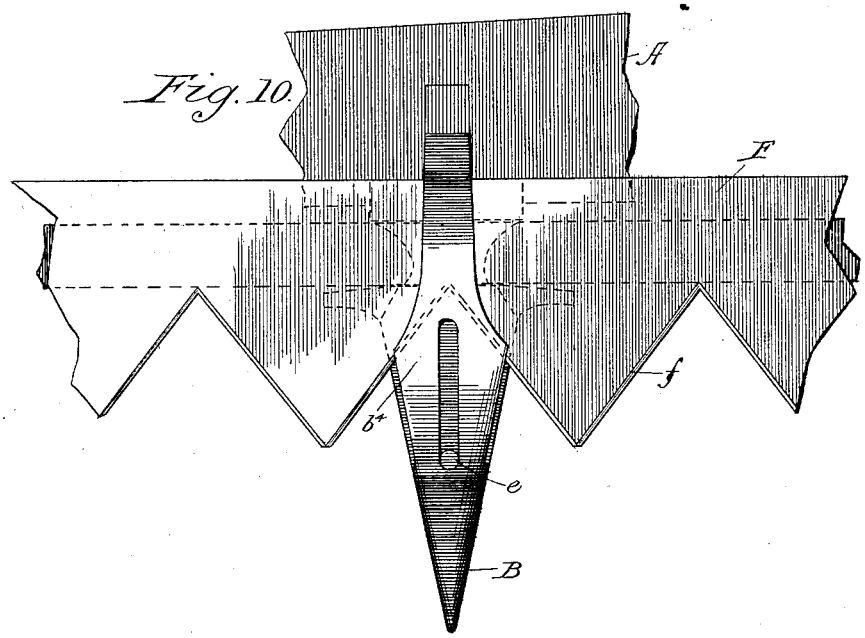
Figure 11:
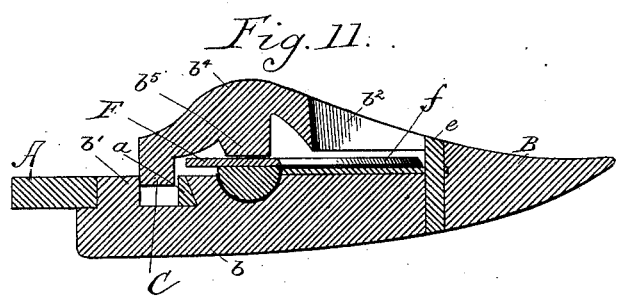

In the drawings, Figure 1 is a top plan view of part of the length of the finger-bar of a reaper or mower, with the corresponding guard-fingers in position, embodying my improvements, the upper part of the guard-finger at the left being partly broken away, so as to show the means for fastening and detaching the ledger-plate. Fig. 2 is a section on the line $x\,x$ in Fig. 1. Fig. 3 is a section on the line $y\,y$ in Fig. 1, the key which completes the locking of the guard-finger to the finger-bar being drawn back. Fig. 4 is a top plan view of the rear part of a guard-finger, the middle one of the three shown in Fig. 1. Fig. 5 is a section on the line $z\,z$ in Fig. 1. Fig. 6 is a section on the line $v\,v$ in Fig. 1. Fig. 7 is a top view of one of the ledger-plates. Fig. 8 is a top view of part of the length of the finger-bar. Fig. 9 is a bottom view of the same. Fig. 10 is a top plan view showing the arrangement of the cutter-bar in the guard-fingers, the finger shown being similar to those appearing at the ends of Fig. 1. Fig. 11 is a sectional view of the parts shown in Fig. 10, the section-plane passing lengthwise of the guard-finger and vertically through the middle of it.

The same letters denote the same parts in all the figures.

A denotes the finger-bar. It has a downward and forward bevel, $a$, on its forward edge, which fits into a correspondingy-beveled shoulder, $b$, on the upper surface of the rear part of each of the guard-fingers B and B', so as to make a close joint between the bar and each guard-finger.

At suitable distances along the finger-bar are slots, each of uniform breadth (say half an inch) on the upper side of the bar. The forward half, $a'$, of the slot is of uniform breadth all the way through the bar from top to bottom. The rear half, $a^2$, gradually narrows from top to bottom, so that on the under side of the bar it is only (say) three-eighths of an inch wide, its sides sloping downward toward each other, as shown in Fig. 5.

Projecting upward from each guard-finger B or B', near its rear end, and to a height equal to the thickness of the finger-bar, is a dovetail gib, $b'$, conformed to the rear part, $a^2$, of the slot in the finger-bar, its distance from the beveled shoulder $b$ of the guard-finger being of course equal to the distance from the forward edge of the finger-bar to the rear part of the slot. By passing the gib up into the forward and straight-sided part, $a'$, of the slot, and then pushing the guard-finger back, the gib becomes engaged with the rear part, $a^2$, of the slot, and the bar and guard-finger are firmly joined together.

Each guard-finger B has the guard $b^2$, which forms the upper side of the guard-slot, extended across the groove or depression $b^3$, in which the cutter-bar F, with its knives $f$, reciprocates so far that its end is over the forward half of the slot in the finger-bar, when the guard-finger is in position on the bar, the extension $b^4$ forming a bracket, from the end of which depends a key, C, adapted to set close in the half-slot $a'$. The bracket and key are made of malleable cast-iron, so that the end of the bracket can be hammered down, whereby the key is driven into the slot, thus preventing any retraction of the guard-finger to draw the dovetail gib $b'$ out of the hinder half, $a^2$, of the slot, and securely locking the guard-finger on the finger-bar, as shown in Fig. 11. This locking device is preferable to the bolt and nut by which the guard-finger has heretofore been fastened to the finger-bar, because in cutting grass or grain, which is lodged or from any cause does not stand erect, the nut on the upper end of the bolt projecting above the guard-finger catches in the grass or straw, which thus becomes entangled around it, and is cut again, thereby causing a waste of power, and leaving the swath in bad shape, besides the danger of clogging the cutting mechanism. My device allows the upper surface of the guard-finger to be perfectly smooth, so that there is nothing for the stalks to hitch on.

From the arched part of the bracket $b^4$, above the groove $b^3$, depends a guide-lug, $b^5$, of suitable length, to rest lightly on the top of the cutter-bar F when the guard-finger is locked in position, and thus form with the groove a guide for the cutter-bar, as shown in Fig. 11 of the drawings.

The purpose of furnishing a guide for the cutter-bar will be sufficiently answered if every alternate guard-finger B be provided with a guide-lug, $b^5$; hence I make the intervening guard-fingers, B', without any extension of the guard $b^2$, so that there is on these fingers nothing in the nature of an upward projection to offer any obstacle to the cut grass or grain in sliding over the finger-bar. Instead of this extension, I cast a similar bracket, $b^6$, of the same length, of malleable iron, on the lower surface of each guard-finger B', carrying on its end a key, C', like the key C, but projecting upward. A depression, $b^7$, in the lower surface of the guard-finger B', and a slot, $b^8$, cut through the finger, allow the bracket to be hammered up against the bottom of the finger, and the key to pass up through the finger into the forward half, $a'$, of the slot in the finger-bar. The same locking effect would be attained if the bracket $b^6$ were dispensed with and a detached key driven into the forward half of the slot in the finger-bar; but it is more convenient that each guard-finger should include in itself a complete locking device.

I make the rest for the ledger-plate somewhat longer from front to rear than is necessary to contain the plate, and at the rear end I raise upon it, at each corner, a diagonal shoulder, $b^9$, whose forward side is undercut, so as to form a dovetail recess or groove for the reception of the edge of the ledger-plate, whose rear corners, $d$, are correspondingly beveled. The recesses, as will be obvious, converge toward the rear. The surplus in the length of the rest is enough to allow the ledger-plate to be placed upon it without engaging with the shoulders $b^9$. It is then pushed back, so that the beveled edges $d$ pass under the projecting upper edges of the shoulders, which thus hold it down in place at the back, the forward end being similarly held down by the upper side of the guard-slot, which is there narrowed for a short distance, so as to leave barely room enough for the ledger-plate to be slipped in. A key, $e$, driven into a correspondingly-shaped hole in the guard-finger at the forward end of the rest, the corresponding end of the ledger-plate being slightly recessed at $d'$ to engage with it, holds the plate back, so that its rear corners engage with the shoulders $b^9$. The ledger-plate is thus firmly and at the same time detachably fastened to the guard-finger, it being easy to drive the key $e$ up again out of its socket, and thus release the plate.

It is obvious that a single shoulder arranged equidistant from the two corners would serve substantially the same purpose as the two diagonal shoulders which I have shown; but I prefer the latter, as giving, on the whole, a firmer hold. They guard also against lateral displacement, like the straight-sided shoulders already in use.

What I claim as my invention, and desire to secure by Letters Patent, is—

1. The finger-bar provided with slots having a forward portion of equal width from top to bottom and a rear portion narrowing from top to bottom, in combination with the guard-finger having a dovetail gib arranged to engage in the rear portion of the slot in the finger-bar, substantially as and for the purpose described.

2. The finger-bar provided with slots having a forward portion of equal width from top to bottom, and a rear portion narrowing from top to bottom, in combination with a guard-finger having a dovetail gib arranged to engage in the rear part of the slot, and a malleable bracket extending lengthwise of the guard-finger and bearing a key arranged to fit in the forward part of the slot when the bracket is hammered toward the finger-bar, substantially as and for the purpose described.

3. In combination with the cutter-bar, the guard-finger having a transverse depression to receive the cutter-bar and a bracket extending across the depression and bearing opposite the depression a depending guide-lug of suitable depth to touch lightly the upper surface of the cutter-bar, substantially as and for the purpose described.

4. The guard-finger having a rest for the ledger-plate somewhat longer than the plate and having at the rear end of the rest shoulders undercut to form dovetail recesses which converge toward the rear, the guard-slot being narrowed at its forward end to equal the thickness of the ledger-plate, in combination with the ledger-plate beveled at its rear end to fit the shoulders, and with a key adapted to fit into the guard-finger at the forward end of the guard-slot and hold the ledger-plate back in the recess of the shoulders, substantially as and for the purpose described.

ALEXANDER McCORMICK.

Witnesses:
FREDERICK P. READ,
SOLOMON HENOCH.